(12) United States Patent
 Ding

(10) Patent No.: US 11,238,834 B2
(45) Date of Patent: Feb. 1, 2022

(54) METHOD, DEVICE AND SYSTEM FOR ADJUSTING IMAGE, AND COMPUTER READABLE STORAGE MEDIUM

(71) Applicant: SZ DJI TECHNOLOGY CO., LTD., Shenzhen (CN)

(72) Inventor: Xiaofei Ding, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/738,324

(22) Filed: Jan. 9, 2020

(65) Prior Publication Data

US 2020/0152156 A1    May 14, 2020

Related U.S. Application Data

(63) Continuation of application No. PCT/CN2017/116179, filed on Dec. 14, 2017.

(51) Int. Cl.
 *G09G 5/377* (2006.01)
 *G09G 5/38* (2006.01)
(52) U.S. Cl.
 CPC .............. *G09G 5/377* (2013.01); *G09G 5/38* (2013.01); *G09G 2340/12* (2013.01); *G09G 2354/00* (2013.01)
(58) Field of Classification Search
 None
 See application file for complete search history.

(56) References Cited

U.S. PATENT DOCUMENTS

| 2014/0375541 | A1* | 12/2014 | Nister | A61B 3/113 |
| | | | | 345/156 |
| 2015/0175068 | A1* | 6/2015 | Szostak | B60K 35/00 |
| | | | | 340/435 |
| 2016/0109701 | A1* | 4/2016 | Goldman-Shenhar | |
| | | | | G02B 27/01 |
| | | | | 345/8 |
| 2016/0314562 | A1* | 10/2016 | Sakamoto | G06T 15/80 |
| 2017/0123492 | A1* | 5/2017 | Marggraff | H04N 5/247 |
| 2017/0148216 | A1* | 5/2017 | Birman | G02F 1/163 |

(Continued)

FOREIGN PATENT DOCUMENTS

| CN | 103561223 A | 2/2014 |
| CN | 104635338 A | 5/2015 |
| CN | 107085306 A | 8/2017 |

(Continued)

OTHER PUBLICATIONS

The World Intellectual Property Organization (WIPO) International Search Report for PCT/CN2017/116179 dated Aug. 31, 2018 6 pages.

*Primary Examiner* — Jennifer Mehmood
*Assistant Examiner* — Jed-Justin Imperial
(74) *Attorney, Agent, or Firm* — Anova Law Group, PLLC

(57) ABSTRACT

A method for adjusting image includes determining, from a background image, a background sub-image corresponding to a foreground sub-image. The foreground sub-image is within a first range of a foreground image, the background image is an image of an external environment, and the foreground image is an image produced by a display device. The method also includes determining a first image attribute of the background sub-image; and adjusting the foreground sub-image based on at least the first image attribute.

20 Claims, 5 Drawing Sheets

(56) References Cited

U.S. PATENT DOCUMENTS

2017/0230628 A1    8/2017   Ichikawa et al.

FOREIGN PATENT DOCUMENTS

| CN | 107102442 A | 8/2017 |
| CN | 107250728 A | 10/2017 |
| CN | 107462994 A | 12/2017 |

* cited by examiner

METHOD, DEVICE AND SYSTEM FOR ADJUSTING IMAGE, AND COMPUTER READABLE STORAGE MEDIUM

CROSS-REFERENCE TO RELATED APPLICATION

This application is a continuation of International Application No. PCT/CN2017/116179, filed Dec. 14, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to image processing and, more particularly, to a method, a device and a system for adjusting image, as well as a computer readable storage medium.

BACKGROUND

With technology developments, Head-up display (HUD) technology similar to that used by aircraft pilots are introduced to modern vehicles. HUD technology facilitates data presentation (e.g., speed, time, etc.) to a driver without requiring the driver to look down at a dashboard. This technology can enable the driver to see the data he needs and at the same time to view road conditions or space ahead. This can avoid potential danger caused by the inability to view the road conditions for a period of time due to looking down, and reduce discomfort of the eyes caused by the need to adjust focus. A common HUD device usually includes a projection unit, which can project the information to be displayed on a front windshield of a vehicle or aircraft to generate, on a glass of the windshield, a picture visible to the naked eye and superimposed on an external view/image.

The HUD device can display information that needs to be displayed in a head-up direction of the driver of the vehicle or aircraft as a picture visible to the naked eye and superimposed on the external image. However, because the color of the displayed image is fixed, the displayed image is easy to be confused or mixed up with background of actual objects outside the vehicle with similar colors, which may interfere with the driver's line of sight. For example, when the HUD device displays information on the front windshield in a gray color, and at this time, if, from the driver's point of view, a gray or near-gray object existing outside the vehicle overlaps with the gray information, it is difficult for the driver to determine whether the gray object exists and/or how far away it is from the vehicle. As another example, when a brightness provided by the projected unit of the HUD device during projection is not high enough, and if the external sight/image is bright, the driver may not be able to see the projection clearly.

SUMMARY

In accordance with the disclosure, there is provided a method for adjusting image. The method includes determining, from a background image, a background sub-image corresponding to a foreground sub-image. The foreground sub-image is within a first range of a foreground image, the background image is an image of an external environment, and the foreground image is an image produced by a display device. The method also includes determining a first image attribute of the background sub-image; and adjusting the foreground sub-image based on at least the first image attribute.

Also in accordance with the disclosure, there is provided a device for adjusting image. The device includes a processor, a first image sensor and a second image sensor, each operably coupled to the processor, and a memory configured to store instructions. The instructions, when being executed by the processor, cause the processor to determine, from a background image, a background sub-image corresponding to a foreground sub-image. The foreground sub-image is within a first range of a foreground image, the background image is an image of an external environment, and the foreground image is an image produced by a display device. The instructions also cause the processor to determine a first image attribute of the background sub-image; and adjust the foreground sub-image based on at least the first image attribute.

BRIEF DESCRIPTION OF THE DRAWINGS

In order to better describe the embodiments of the present disclosure and their advantages, reference will now be made to the following description in accordance with the accompanying drawings.

Figure 1A:
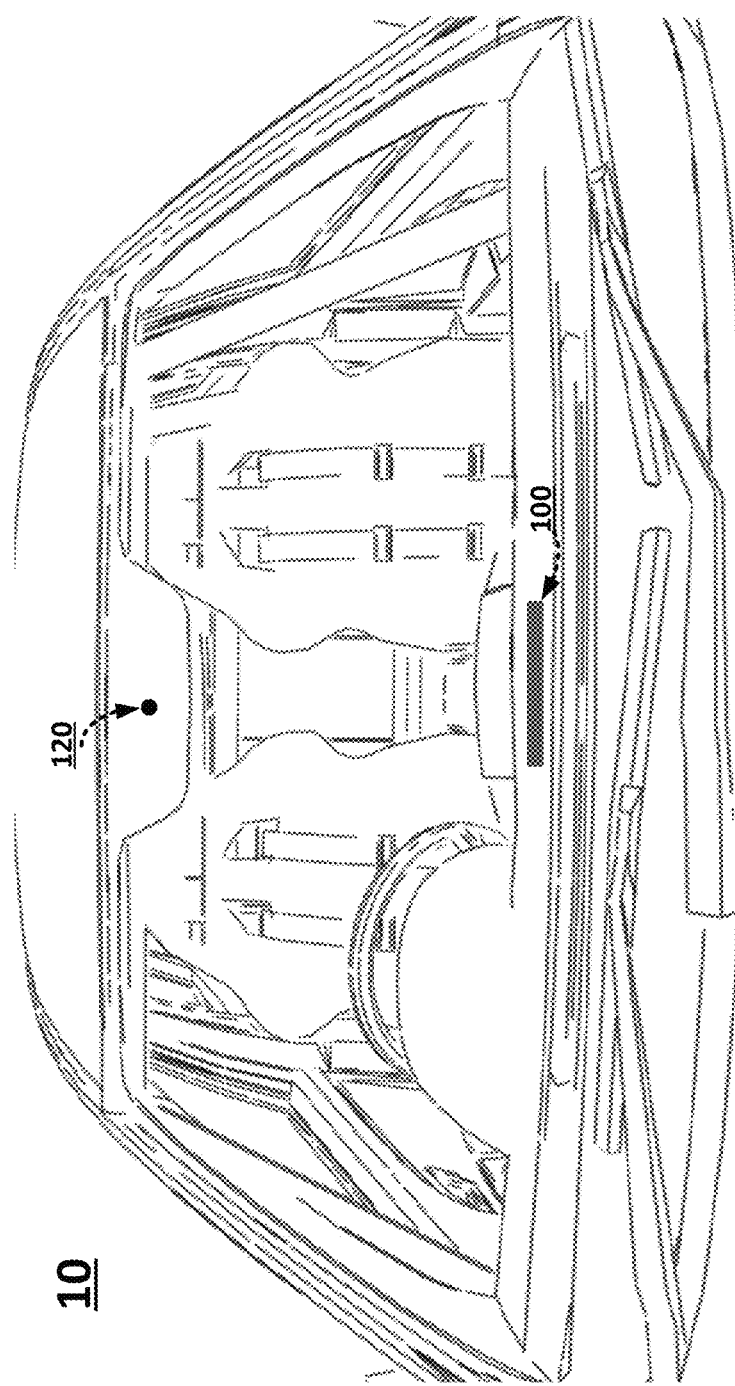
FIGS. 1A and 1B illustrate an example application scenario of a Head-up Display (HUD) system configured to assist driving according to an example embodiment.

In addition, the drawings are not necessarily drawn to scale, but are shown only in a schematic manner that does not affect the reader's understanding.

DETAILED DESCRIPTION OF THE EMBODIMENTS

Technical solutions of the present disclosure will be described with reference to the drawings. Other aspects, advantages, and prominent features of the present disclosure will become apparent to those skilled in the art.

In the present disclosure, terms "include", "including" or any other variations thereof are intended to cover non-exclusive inclusions.

It will be appreciated that the described embodiments are part rather than all of the embodiments of the present disclosure. Other embodiments conceived by those having ordinary skills in the art on the basis of the described embodiments without inventive efforts should fall within the scope of the present disclosure. In addition, descriptions of well-known functions and constructions are omitted for clarity and conciseness. Further, in the accompanying drawings, same numbers refer to the same or similar elements unless otherwise specified. In addition, although solutions with different features may be described in different embodiments, those skilled in the art should realize that all or part of the features of different embodiments may be combined to form new embodiments without departing from the spirit and scope of the present disclosure.

In order to at least partially solve or alleviate the problems described above, embodiments of the present disclosure provide a method, device, system, and/or computer-readable storage medium for adjusting an image. Generally, in some embodiments of the present disclosure, by judging the closeness or similarity between a color of a Head-up Display (HUD) projection (or more generally, a foreground image) and a color of an external background (or more generally, a background image), the color of the HUD projection can be adjusted accordingly, so as to ensure that a content of the HUD projection is not confused or mixed with overlapping objects outside a vehicle. For example, if the overlapping background is gray, according to some embodiments of the present disclosure, this background color value can be calculated in real time and, for example, its contrasting color (e.g., red) can be found, and this information can be delivered to the HUD display system, and the HUD display system can adjust its display effect based on this information (e.g., changing the color of elements shown at a position overlapping a background object to the contrasting color).

It should be noted that although the vehicle-mounted HUD device is used as an example to describe technical solutions of some embodiments of the present disclosure, the present disclosure is not limited thereto. In fact, the present disclosure is equally applicable to other fields that need to adjust one or both of a foreground image and a background image to avoid confusion, including but not limited to: virtual reality (VR) displays (e.g., VR headsets, etc.), augmented reality (AR) displays (e.g., smart wearables such as Google Glass, etc.), aircraft HUD devices. In addition, it should also be noted that, although "color" is used as an example to describe image attributes that need to be adjusted in the following embodiments of the present disclosure, the present disclosure is not limited thereto. In fact, image properties that can be adjusted may include, but not limited to, at least one of: color, hue, tone, saturation, brightness, or contrast.

Moreover, it should also be noted that although the HUD device in projection is taken as an example to describe the technical solutions of some embodiments of the present disclosure, the present disclosure is not limited thereto. In fact, the present disclosure is also applicable to cases where the foreground image and/or the background image are generated by other means. For example, in a case where a transparent display (for example, a transparent OLED display) is adopted to replace a projection surface for the HUD device (e.g., a front windshield), the foreground image may be directly generated by and shown on the transparent display. As another example, when a VR helmet is used, both the foreground image and the background image may be generated by a display in the VR helmet.

Hereinafter, an application scenario and an actual arrangement of a HUD system according to an embodiment of the present disclosure will be described in detail with reference to FIGS. 1A and 1B.

Figure 1B:
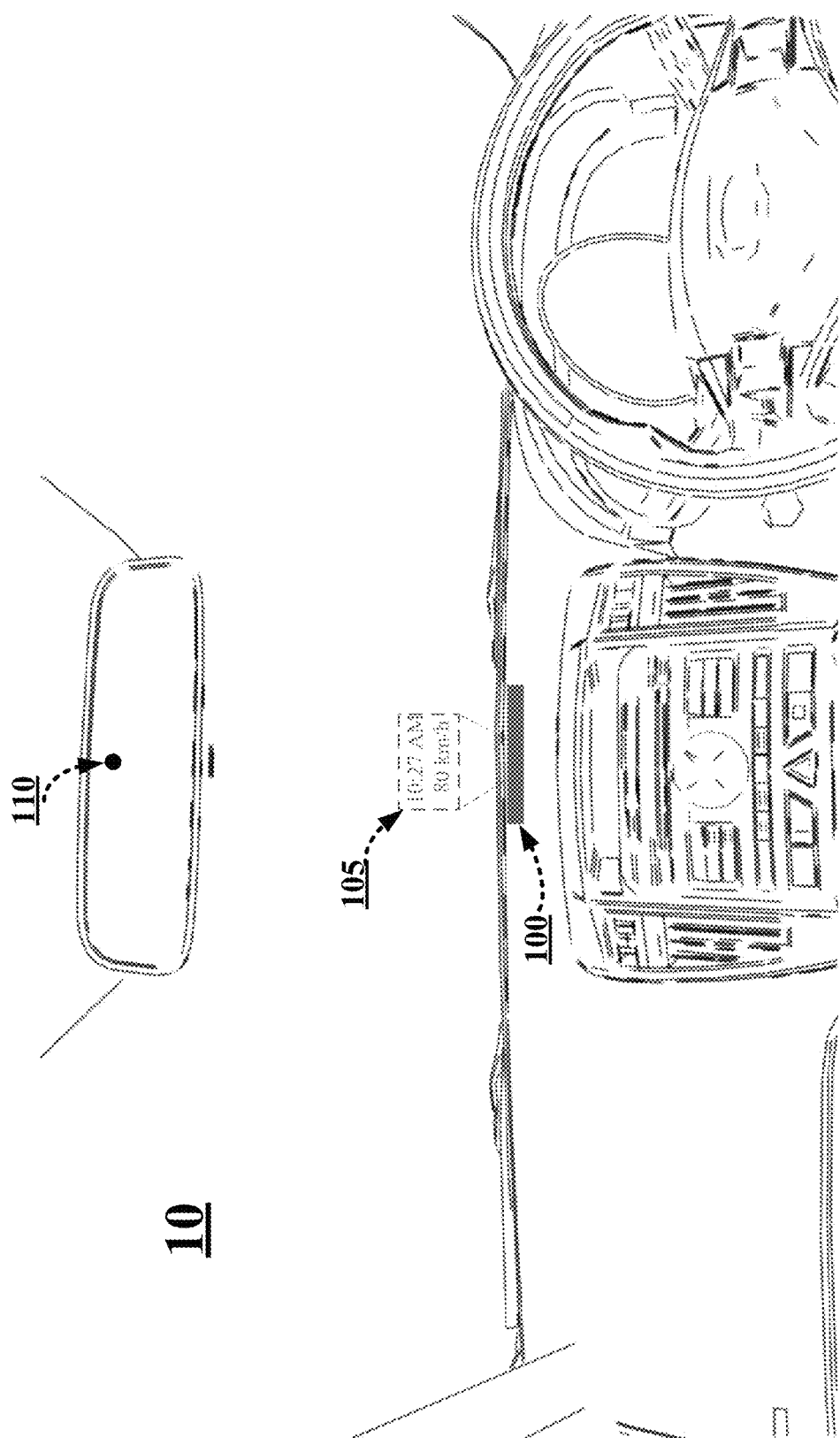

FIGS. 1A and 1B illustrate an example application scenario of an example HUD system 10 for assisted driving according to an embodiment of the present disclosure. As shown in FIGS. 1A and 1B, the system 10 may include a HUD device 100, an internal camera 110 (or more generally, a first image sensor 110), and an external camera 120 (or more generally, a second image sensor 120). The functions of these devices and/or components can be combined or further separated. For example, in some embodiments, the HUD device 100, the internal camera 110, and the external camera 120 may be integrated into a same device, such as a central intelligent rearview mirror of a vehicle. The internal camera 110 may be integrated on one side of the central smart rearview mirror facing the driver, and the external camera 120 and a projection unit for projecting on the front windshield may be integrated on the other side of the central smart rearview mirror. As another example, in other embodiments, the HUD device 100 may not be included, an a transparent display (e.g., an OLED display) may be used as or on a front windshield or an additional transparent display may be configured, instead of the projection-type HUD device 100, to display desired foreground information at the front windshield or the additional transparent display.

In addition, the system 10 may not include, for example, one or more of the HUD device 100, the internal camera 110, or the external camera 120. For example, in a case where the vehicle itself has an external camera, the system 10 may include only the internal camera 110 and the HUD device 100, and acquire an external image captured by the existing external camera in the vehicle through a wired or wireless manner. Similarly, the system 10 may not include the internal camera 110 and/or the HUD device 100. This situation may occur, for example, when the vehicle itself has a driving camera (for example, a driving recorder, an anti-fatigue system, etc.) and/or an on-board HUD device. In these cases, the following operations can be performed by combining components with part of the functions of the aforementioned system 10 with existing on-board equipment.

In some embodiments corresponding to FIGS. 1A and 1B, the HUD device 100, the internal camera 110, and/or the external camera 120 may communicate with each other in various ways (for example, wired or wireless) to transfer instructions and/or data. For example, in one embodiment, the internal camera 110 and the external camera 120 may be connected and communicated through a wired method (for example, via I²C, a bus in the vehicle, etc.), and may be wirelessly connected with the HUD device 100 (e.g. via Wi-Fi, Bluetooth, etc.) for communication. The present disclosure does not limit the communication method.

In addition, although both the internal camera 110 and the external camera 120 are arranged on a center rearview mirror (respectively disposed on two sides of the center rearview mirror) and the HUD device 100 is disposed on a vehicle center console (for example, an in-vehicle infotainment system) as shown in FIGS. 1A and 1B, the present disclosure is not limited thereto. In fact, these components can be placed in any suitable location. For example, the external camera 120 may be arranged outside the car, such as on a roof, at a front bumper, etc.; the internal camera may be arranged on a steering wheel, a sun visor in the driving position, etc.; the HUD device 100 may be arranged at a side of the center mirror away from the driver, near roof lights, on a front cover of the car, etc. In addition, although FIGS. 1A and 1B show the system 10 installed in a right-hand steering vehicle, the present disclosure is equally applicable to other forms of transportation vessels (e.g., left-hand steering vehicle, airplane, head-mounted display, smart glasses, etc.).

As shown in FIG. 1B, the HUD device 100 is configured to project HUD information 105 on the front windshield. Although the projected HUD information 105 shown in FIG. 1B just includes time and vehicle speed, the present disclosure is not limited thereto. The HUD information 105 may include (but is not limited to): various vehicle condition parameters (for example, average/maximum/real-time vehicle speed, mileage, engine speed, coolant temperature, fuel level, etc.), various environmental information (for example, time, temperature, traffic conditions, etc.), various navigation information, and/or other image and/or video information.

Further, the projection or display position of the HUD information 105 is not limited to the middle and lower part of the front windshield as shown in FIG. 1B, but can be any appropriate position. The projection range is not limited to that shown in FIG. 1B, but can be any suitable range. For example, in some embodiments where a transparent display is used as the front windshield, HUD information may even be displayed on the entire front windshield, such as marking auxiliary information next to each external object that the driver may see through the front windshield. The auxiliary information may include distance to the vehicle, object type, etc.

Hereinafter, a technical solution for adjusting an image according to some embodiments of the present disclosure will be described in detail in accordance with FIG. 2 and with reference to FIGS. 1A and 1B.

Figure 2:
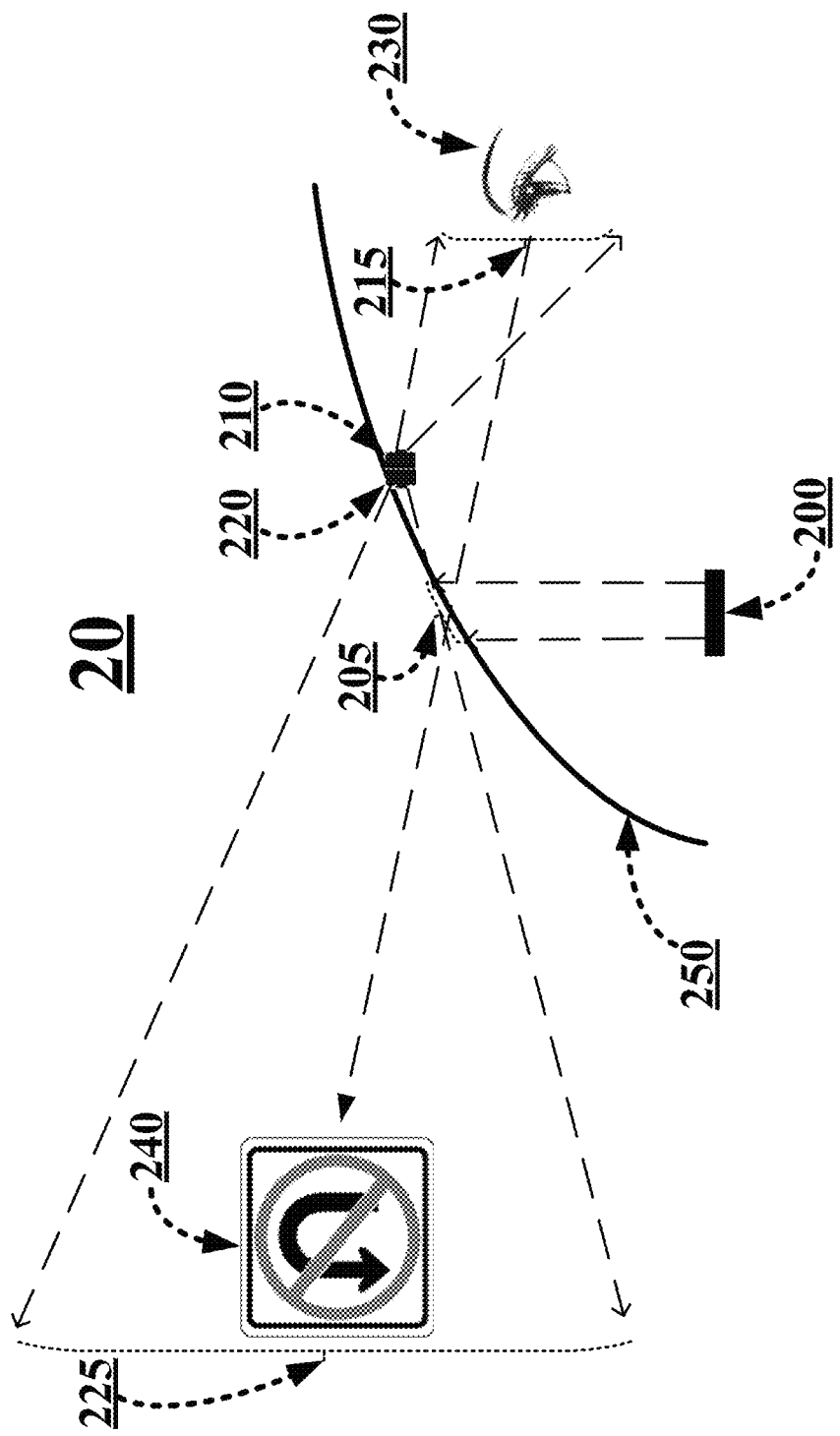
FIG. 2 is a schematic diagram illustrating a principle of adjusting a HUD image viewed by an observer according to an example embodiment.

FIG. 2 is a schematic diagram illustrating a system 20 adjusting HUD image viewed by an observer (e.g., driver) according to an example embodiment of the present disclosure. As shown in FIG. 2, the driver can sit in a driving position in a car, and his/her eyes 230 can observe external objects, i.e., view objects outside the car through the front windshield. For example, as shown in FIG. 2, there is an observation object 240 (e.g., a traffic sign) outside the car. At the same time, the HUD device 200 can project a desired image (hereinafter may be referred to as a foreground image 205) on a front windshield 250. In one embodiment, as shown in FIG. 2, since a line connecting a location of the observation object 240 and the driver's eye 230 intersects the front windshield 250 at a range corresponding to the foreground image 205, from the driver's perspective, the foreground image 205 may be blocking the view of the observation object 240. In addition, since positions of the external camera 220 and the internal camera 210, a position of the foreground image 205 generated by the HUD device 200, and a position of the driver's eye 230 are all known, a specific range corresponding to the observation object 240 in the background image 225 can be obtained accordingly. It can be understood that the internal camera 210 may recognize the driver's line of sight 215 (e.g., replacing the position of the eye 230 with the recognized line of sight) to obtain the observation object 240 in the background image 225 corresponding to the foreground image 205. After the specific foreground image 205 and the corresponding observation object 240 are determined, a processor of the HUD device 200 can compare the two (i.e., the foreground image 205 and the observation object 240) to determine their color similarity. As described above, if the color of the observation object 240 and the foreground image 205 are the same or close to each other, it may be difficult for the driver to accurately identify the foreground image 205. When the foreground image 205 is mixed up with the observation object 240, it may cause the driver to fail to accurately identify the content projected and displayed by the HUD device 200, thereby causing the HUD device 200 to lose its function for a period of time, and some vehicle information may become unavailable to the driver which leads to possible driving risks. Further, if the color of the observation object 240 and the foreground image 205 are the same or close to each other, it may also make it difficult for the driver to accurately identify the observation object 240. For example, as shown in FIG. 2, when the driver cannot accurately recognize the observation object 240 (e.g., the traffic sign) because a view of the foreground image 205 interferes with the observation object 240, the driver may violate a traffic rule (for example, making an illegal U-turn). More generally, when it is difficult for the driver to accurately identify the observation object 240, there may be various other potential dangers, such as a traffic accident.

In order to at least partially solve or mitigate the above problems, the system 10 as shown in FIGS. 1A and 1B may be used. In FIG. 2, the internal camera 210 (corresponding to the internal camera 110 in FIG. 1B) can be configured to capture an eye image 215 including the eye of the observer (or more generally, an observer image 215 indicating an observation position of the observer), and an actual position of the eye 230 (e.g., physical location of the eye) is determined according to the captured eye image 215. For example, in some embodiments, the position of the eye 230 in the eye image 215 (i.e., image position of the eye 230) may be determined according to an image recognition algorithm, and the actual position of the eye 230 in the vehicle may be determined according to a predetermined position of the internal camera 210 and/or a preset correspondence table (e.g., correspondence between image positions and actual positions of the eye). In addition, the actual position of the eye 230 in the vehicle may be determined according to other methods. For example, the driver can manually input his/her "sitting-height" position through an interactive interface, or determine the actual position through a gaze tracker. In some embodiments, since the position and height of the driver are relatively fixed, the eye position detection process may be performed just once after the driver enters the driver's seat or cockpit. However, in other embodiments, since the driver cannot be completely still while driving, in order to better adjust image attributes of the foreground image 205 as described below according to the position of the driver's eye 230, the actual position of the eye 230 of the driver can be detected multiple times, such as periodically, irregularly, in real time, or in response to some specific trigger event.

In addition, although the observer is shown as a human in FIG. 2, the present disclosure is not limited thereto. In fact, the observer can also be a visible light sensor such as a camera and/or an infrared image sensor. For example, in the case of unmanned driving, automatic driving or remotely controlled driving, other non-human observers can be used to control the vehicle instead of human drivers, or other non-human observers can be used by a human to remotely control the vehicle.

Simultaneously with, before or after the operation of the internal camera 210, or independently of the operation of the internal camera 210, the external camera 220 (corresponding to the external camera 120 in FIG. 1A) can be configured to capture an image of the outside of the vehicle (hereinafter referred to as background image 225). According to the background image 225 and at least a portion of the foreground image 205, a background sub-image (i.e., at least a portion of the background image 225, such as the portion that includes the observation object 240) in the background image 225 corresponding to a foreground sub-image (i.e., at least a portion of the foreground image 205, such as a portion corresponding to a first range of the foreground image 205) may be determined according to one or more of the following parameters: installation position and/or shooting angle of the external camera 220; the position of the eye 230, the actual position of the foreground sub-image, and/or the positional relationship between the foreground sub-image and the external camera 220, etc. As mentioned before, in some embodiments, since the foreground image 205 projected or generated by the HUD device 200 may spread across the entire front windshield, the driver may only care about a portion of the foreground image 205 within a certain range (i.e., foreground sub-image). For example, in the embodiment shown in FIG. 1B, HUD information displayed on the front windshield 250 may include, besides the HUD information 105 as shown at a specific position, other HUD information at other positions (for example, additional information associated with some observation objects, such as relative distance, object type, etc.), and some of the HUD information may be additional information added in the foreground image 205 next to corresponding observation object(s), which neither overlaps with any observation object 240 nor causes any confusion. There may only be a need for adjusting the HUD information 105 which has a fixed display position. In other words, the adjustments may only be relevant to the foreground sub-image (e.g., HUD information 105) in the first range in the foreground image 205 that corresponds to the background sub-image.

In some embodiments, referring to FIG. 2, according to the eye image 215 of the eye 230 captured by the internal camera 210, the actual position of the eye 230 can be determined. A coverage range of the foreground image 205 (e.g., an area occupied by the projected content on the front windshield) may be determined according to a position and projection direction of the HUD device 200 and an angle and/or position of the front windshield. In addition, considering that not all parts of the foreground image 205 can obscure the driver's view, the foreground sub-image corresponding to or within a first range (for example, the portion/range that displays contents with colored font, or in an extreme case, the entire range of the foreground image 205 being displayed) of the foreground image 205 can be determined. Further, a correspondence relationship between a range covered by the background image 225 and the first range of the foreground image 205 (i.e., the foreground sub-image) may be determined according to the installation position and shooting angle of the external camera 220, and/or the aforementioned first range. Additionally, a background sub-image (for example, a background sub-image including the observation object 240 shown in FIG. 2) within or at a second range of the background image 225 corresponding to the foreground sub-image can be determined.

In addition, in some embodiments, since data such as position of the internal camera 210, position of the external camera 220, driver position, and front windshield angle are relatively fixed, some aforementioned operations can be simplified through a pre-calibration process. For example, when the driver installs the HUD device 200 for the first time or when the HUD device 200 is started for the first time after each driver enters the vehicle, the driver may be required to directly determine the background sub-image by, for example, indicating the range blocked by the foreground sub-image in the background image 225.

After determining the background sub-image, the system 20 may be configured to determine one or more image attributes of the background sub-image, including (but not limited to): color, hue, tone, saturation, brightness, and/or contrast. This determination may be made based on an average value, a maximum value or any other suitable value of the corresponding image attribute of each pixel in the background sub-image. For example, the color of the background sub-image can be determined based on an average of color values of all pixels in the background sub-image (e.g., in RGB format). Similarly, values (e.g., color value) of same type of image attribute of the foreground sub-image can be determined.

After the system 20 determines that one or more of the image attributes of the foreground sub-image and the background sub-image are the same or similar, the corresponding image attributes of the foreground sub-image may be adjusted. For example, when the difference between the average values of colors of the foreground sub-image and the background sub-image is not greater than a predetermined threshold (for example, in a RGB format where color values range from 0 to 255, the predetermined threshold is 55), the corresponding image attributes of the foreground sub-image may be adjusted so that the difference between the two is not less than the predetermined threshold. In a specific example, when the average color of the foreground sub-image is (255, 0, 0) (that is, pure red) and the color of the background sub-image is (227, 23, 13) (that is, cadmium red), value differences at one or more of the color channels (e.g., 28, 23, 13 at RGB channels respectively) are not greater than the predetermined threshold (e.g., 55). Accordingly, the color of the foreground sub-image can be adjusted to (0, 255, 0) (that is, pure green) to avoid having the same or similar color to the background sub-image. Similarly, other image attributes can also be modified to prevent the background sub-images from being the same or similar in color. For other image attributes, adjustments can be performed in a similar manner.

In addition, considering that the driver's line of sight may not always be focused on the position of the foreground image 205, it is more common for a driver to glance at the foreground image 205 occasionally. In this case, it is not necessary to always change the image attributes of the foreground image 205 and/or the foreground sub-image according to the image attributes of the background sub-image. Accordingly, in some embodiments, after obtaining the eye image 215 of the driver captured by the internal camera 210, the system 20 may be configured to determine a line of sight of the driver according to the eye image 215. For example, in some embodiments, pupil position of the driver can be determined based on the eye image 215, and the line of sight corresponding to the pupil position can be found in a preset look-up table based on the determined pupil position. In other embodiments, a gaze tracker may be used to determine the driver's line of sight. The present disclosure does not specifically limit the manner of determining the driver's line of sight.

The system 20 may be configured to determine whether the driver's line of sight intersects the first range where the foreground sub-image is located. If they intersect, subsequent comparing and/or adjusting operations may be performed as described above, which may include (but are not limited to): determining the background sub-image, determining the image attributes of the background sub-image, and/or adjusting image attributes of the foreground sub-image based on corresponding image attributes of the background sub-image. On the other hand, if the line of sight do not intersect the foreground sub-image, the system 20 may return to the previous operation of monitoring the driver's line of sight without performing adjustments to the foreground sub-image. In this way, the problem of driver discomfort or distraction caused by rapid image attribute change of the foreground sub-image from rapid change of the scene outside the vehicle can be avoided.

In addition, as mentioned above, the image adjustment scheme according to some embodiments of the present disclosure can also be applied to other scenarios, such as smart glasses. In an application scenario of smart glasses, the HUD device 200 may be replaced by lens for the glasses, and the external camera 220 may be replaced by a camera of the smart glasses. In addition, since the positional relationship of the glasses relative to the eyes of the user is fixed, there is no need to use the internal camera 210. In this application from the perspective of the user, the foreground image or foreground sub-image superimposed on the background image or background sub-image that the user sees through the smart glasses can be adjusted correspondingly according to the foregoing method, so as to prevent the user from confusing the background (sub) image with the foreground (sub) image. In addition, in application scenarios such as VR helmets, the image attributes of the background (sub) image can also be adjusted, so that confusion caused by overlapping background (sub) image and foreground (sub) image can also be avoided.

In addition to adjusting image attributes, other attributes of the background (sub) image and the foreground (sub) image may be adjusted. For example, the position of the foreground sub-image can be adjusted to avoid being close to a background sub-image having similar color.

In this way, by adopting the image adjustment method, device, and/or system according to the above embodiments of the present disclosure, the confusion caused by overlapping of HUD display content and external background can be eliminated or at least reduced, the user experience is improved, and the danger of the driving is reduced.

Furthermore, although the above embodiments are mainly described using the system 20 as the execution subject, the foregoing operations may be performed on any one or more devices in the system 20 (for example, the HUD device 200, the internal camera 210, and/or the external camera 220)), or devices other than these devices.

Figure 3:
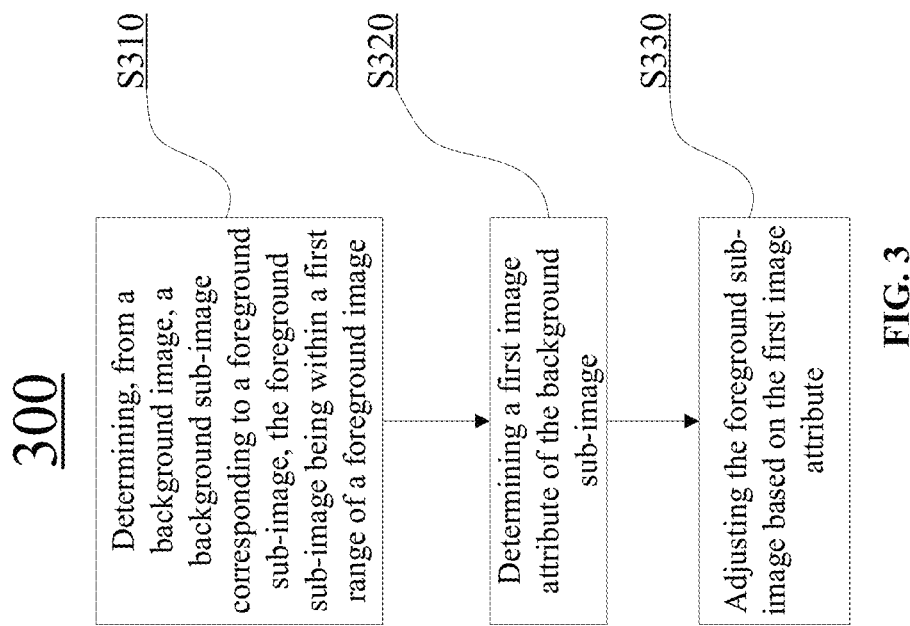
FIG. 3 is a schematic flow chart of a method for adjusting image according to an example embodiment.
Figure 4:
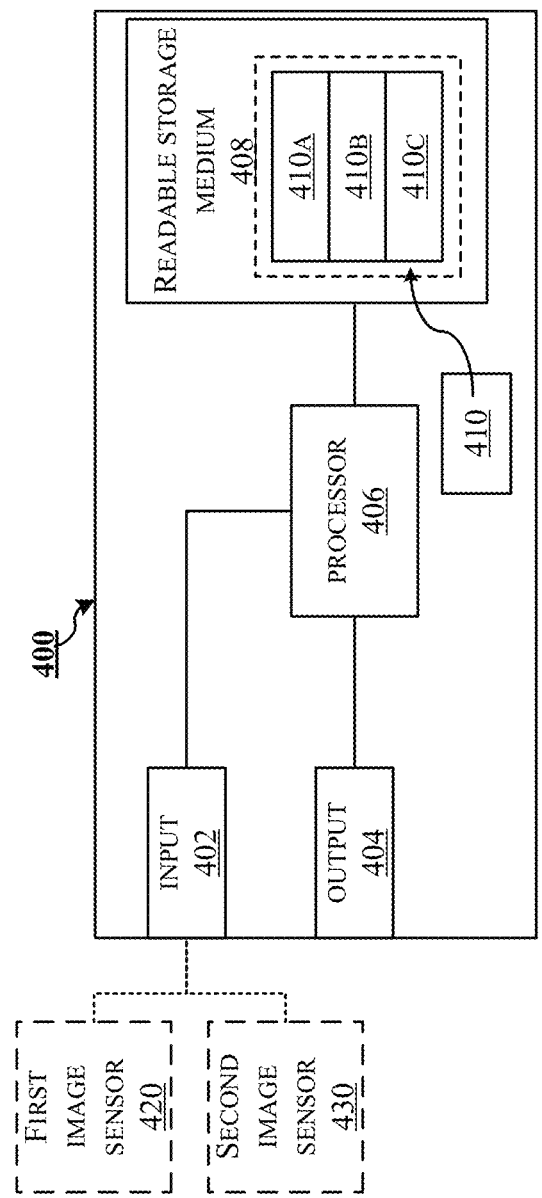
FIG. 4 is a schematic hardware layout diagram of a device for adjusting image according to an example embodiment.

The present disclosure also provides an image adjusting method. The method 300 for adjusting an image as shown in FIG. 3 may be performed on a hardware arrangement 400 as shown in FIG. 4. Embodiments of the method 300 will be described in detail below with reference to FIGS. 1A, 1B, and 2.

The method 300 may begin at step S310. At S310, a processor 406 of the hardware arrangement 400 may determine, from a background image, a background sub-image that corresponds to a foreground sub-image, the foreground sub-image being within a first range of the foreground image.

At S320, the processor 406 of the hardware arrangement 400 may determine a first image attribute of the background sub-image.

At S330, the processor 406 of the hardware arrangement 400 may adjust the foreground sub-image based on at least the first image attribute.

In some embodiments, the first image attribute may include at least one of: color, hue, saturation, brightness, or contrast. In some embodiments, step S310 may include: determining an observation position of an observer viewing the background image and the foreground image; and determining an image within a second range of the background image as a background sub-image based on the first range and the observation position. In some embodiments, determining the observation position of the observer viewing the background image and the foreground image may include: using a first image sensor to obtain an observer image (i.e., an image that contains the observer and/or reflects an observation position of the observer); and determining the observation position according to the observer image. In some embodiments, step S310 may include: determining a line of sight of an observer viewing the background image and the foreground image; and if the line of sight intersects the foreground sub-image, based on the first range and the line of sight, determining an image within a second range of the background image as the background sub-image. In some embodiments, determining the line of sight of an observer observing the background image and the foreground image may include: using a first image sensor to obtain an image of an eye of the observer; and determining the line of sight of the observer based on the image of the eye.

In some embodiments, the background image may be captured using a second image sensor. In some embodiments, the foreground image may be an image generated by projection on a transparent or translucent medium. In some embodiments, the transparent or translucent medium may be glass or plastic, and the foreground image may be an image produced by a head-up display projecting on glass or plastic. In some embodiments, the foreground image may be an image generated directly on a transparent or translucent medium. In some embodiments, the transparent or translucent medium may be a transparent display, and the foreground image may be an image generated by the transparent display.

In some embodiments, step S330 may include: if a difference between a second image attribute of the foreground sub-image and the first image attribute is less than a predetermined threshold, the value of the second image attribute may be adjusted to have a difference value (i.e., difference value between the second image attribute of the foreground sub-image and the first image attribute of the background sub-image) greater than the predetermined threshold. In some embodiments, step S330 may include: if the difference between the second image attribute and the first image attribute of the foreground sub-image is less than the predetermined value threshold, and if an area of the first range corresponding to the foreground sub-image (e.g., the area on the front windshield occupied by the foreground sub-image) is greater than a predetermined area threshold, the value of the second image attribute is adjusted to a value having a difference from the first image attribute greater than the predetermined value threshold. In some embodiments, step S330 may include: adjusting a range of the foreground sub-image in the foreground image based on at least the first image attribute.

FIG. 4 is a block diagram illustrating an example hardware layout/arrangement 400 according to an embodiment of the present disclosure. The hardware arrangement 400 may include a processor 406, such as a central processing unit (CPU), a digital signal processor (DSP), a microcontroller unit (MCU), a neural network processor/accelerator, etc. The processor 406 may be a single processing unit or multiple processing units configured to perform different actions of the processes described herein. The arrangement 400 may also include an input unit 402 configured to receive signals from other entities, and an output unit 404 configured to provide signals to other entities. The input unit 402 and the output unit 404 may be arranged as a single entity or separate entities. In some embodiments, the hardware arrangement 400 may correspond to the HUD device 100 shown in FIGS. 1A and 1B and/or the HUD device 200 shown in FIG. 2. In other embodiments, the hardware arrangement 400 may also correspond to another one or more devices.

In addition, the arrangement 400 may further include a first image sensor 420 (for example, corresponding to the aforementioned internal camera 110 or 210) and/or a second image sensor 430 (for example, corresponding to the aforementioned external camera 120 or 220). As mentioned above, the first image sensor 420 and/or the second image sensor 430 may be part of the hardware arrangement 400 or an external device outside the hardware arrangement 400.

Furthermore, the arrangement 400 may include at least one readable storage medium 408 in the form of a non-volatile or volatile memory, such as an electrically erasable programmable read-only memory (EEPROM), a flash memory, and/or a hard disk driver. The readable storage medium 408 stores computer program instructions 410. The computer program instructions 410 may include code and/or computer readable instructions that, when being executed by the processor 406 in the arrangement 400, cause the hardware arrangement 400 and/or an electronic device that includes the hardware arrangement 400 to execute, for example, the processes described above in conjunction with FIGS. 1-3 and any variations thereof.

The computer program instructions 410 may be configured as computer program instruction codes having, for example, an architecture of computer program instruction modules 410A-410C. In an example embodiment where the hardware arrangement 400 is used in an electronic device, the code in the computer program instructions of the arrangement 400 includes a module 410A configured to determine, in a background image, a background sub-image corresponding to a foreground sub-image within a first range of the foreground image. The code in the computer program instructions further includes: a module 410B, configured to determine a first image attribute of the background sub-image. The code in the computer program instructions further includes a module 410C, configured to adjust the foreground sub-image based on at least the first image attribute.

The computer program instruction module can substantially execute the actions of embodiments consistent with FIGS. 1 to 3 to simulate a corresponding hardware module. In other words, when different computer program instruction modules are executed in the processor 406, they may correspond to the same and/or different hardware modules in the electronic device.

In some embodiments, code means in the embodiment disclosed above in connection with FIG. 4 is implemented as a computer program instruction module, which when being executed by the processor 406 causes the hardware arrangement 400 to perform the actions described above in connection with FIGS. 1 to 3. In alternative embodiments, at least one of the code means may be implemented at least partially as a hardware circuit.

The processor may be a single CPU (Central Processing Unit), but may alternatively include two or more processing units. For example, the processor may include a general-purpose microprocessor, an instruction set processor, an associated chipset, and/or a special-purpose microprocessor, such as an application-specific integrated circuit (ASIC). The processor may also include on-board memory for caching purposes. Computer program instructions may be carried by a computer program instruction product connected to a processor. The computer program instruction product may include a computer-readable medium having computer program instructions stored thereon. For example, the computer program instruction product may be a flash memory, a random access memory (RAM), a read-only memory (ROM), and an EEPROM, and the above-mentioned computer program instruction module(s) may be distributed in the form of a memory in the UE to different computer program instruction products.

It should be noted that functions described herein as implemented by pure hardware, pure software, and/or firmware can also be implemented by means of dedicated hardware, a combination of general-purpose hardware and software, and the like. For example, functions described as being implemented by dedicated hardware (e.g., field programmable gate array (FPGA), application-specific integrated circuit (ASIC), etc.) can be implemented by general-purpose hardware (e.g., central processing unit (CPU), digital signal processor (DSP)) and software, and vice versa.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for adjusting image, comprising:
    displaying, to an observer, a foreground image produced by a display device, the foreground image including a foreground sub-image within a first range of the foreground image;
    determining a background image, the background image being an image of an external environment; and
    after the foreground image is displayed to the observer:
        monitoring a line of sight of the observer;
        determining whether the line of sight intersects the foreground sub-image;
        in response to determining that the line of sight intersects the foreground sub-image:
            determining, from the background image, a background sub-image corresponding to the foreground sub-image;
            determining a first image attribute of the background sub-image; and
            adjusting the foreground sub-image based on at least the first image attribute; and
        in response to determining that the line of sight does not intersect the foreground sub-image:
            continuing to monitor the line of sight of the observer; and
            controlling to not adjust the foreground sub-image based on the background image.

2. The method of claim 1, wherein determining the background sub-image comprises:
    determining an observation position of the observer; and
    determining, based on the first range and the observation position, an image within a second range of the background image as the background sub-image.

3. The method of claim 2, wherein determining the observation position comprises:
    obtaining, by using a first image sensor, an observer image containing the observer; and
    determining the observation position based on the observer image.

4. The method of claim 1, wherein determining the line of sight of the observer comprises:
    obtaining, by using a first image sensor, an image of an eye of the observer; and
    determining the line of sight based on the image of the eye.

5. The method of claim 4, wherein determining the line of sight of the observer comprises:
    determining a pupil position of the eye of the observer according to the eye image; and determining the line of sight corresponding to the pupil position.

6. The method of claim 5, wherein determining the line of sight of the observer comprises:
determining the line of sight corresponding to the pupil position using a look-up table.

7. The method of claim 1, wherein the background image is captured by a second image sensor.

8. The method of claim 1, wherein:
the foreground image is at least one of: projected on a first transparent or translucent medium, or directly produced on a second transparent or translucent medium.

9. The method of claim 1, wherein adjusting the foreground sub-image based on at least the first image attribute comprises:
upon determining that a difference between a value of a second image attribute of the foreground sub-image and a value of the first image attribute is not greater than a preset threshold, adjusting the value of the second image attribute, the difference between the adjusted value of the second image attribute and the value of the first image attribute being not less than the preset threshold.

10. The method of claim 1, wherein adjusting the foreground sub-image based on at least the first image attribute comprises:
upon determining that a difference between a value of a preset image attribute of the foreground image and a value of the first image attribute is not greater than a preset threshold, adjusting a value of a second image attribute of the foreground sub-image, the difference between the adjusted value of the second image attribute and the value of the first image attribute being not less than the preset threshold.

11. The method of claim 1, wherein adjusting the foreground sub-image based on at least the first image attribute comprises:
adjusting a position of the foreground sub-image in the foreground image based on at least the first image attribute.

12. The method of claim 1, wherein at least a portion of the foreground image does not intersect the line of sight of the observer.

13. A device for adjusting image, comprising:
a processor;
a first image sensor and a second image sensor, each operably coupled to the processor; and
a memory configured to store instructions, the instructions, when being executed by the processor, cause the processor to:
control displaying a foreground image produced by a display device to an observer, the foreground image including a foreground sub-image within a first range of the foreground image;
determine a background image, the background image being an image of an external environment; and
after the foreground image is displayed to the observer:
monitor a line of sight of the observer;
determine whether the line of sight intersects the foreground sub-image;
in response to determining that the line of sight intersects the foreground sub-image:
determine, from the background image, a background sub-image corresponding to the foreground sub-image;
determine a first image attribute of the background sub-image;
adjust the foreground sub-image based on at least the first image attribute; and
in response to determining that the line of sight does not intersect the foreground sub-image:
continue to monitor the line of sight of the observer; and
control not to adjust the foreground sub-image based on the background image.

14. The device of claim 13, wherein the instructions further cause the processor to:
determine an observation position of the observer; and
determine, based on the first range and the observation position, an image within a second range of the background image as the background sub-image.

15. The device of claim 14, wherein the instructions further cause the processor to:
receive, from the first image sensor, an observer image containing the observer, the observer image being captured by the first image sensor; and
determine the observation position based on the observer image.

16. The device of claim 13, wherein the instructions further cause the processor to:
receive, from the first image sensor, an image of an eye of the observer, the image of the eye being captured by the first image sensor; and
determine the line of sight based on the image of the eye.

17. The device of claim 13, wherein the background image is captured by the second image sensor; and the instructions further cause the processor to receive the background image from the second image sensor.

18. The device of claim 13, wherein:
the foreground image is at least one of: projected on a first transparent or translucent medium, or directly produced on a second transparent or translucent medium.

19. The device of claim 13, wherein the instructions further cause the processor to:
upon determining that a difference between a value of a second image attribute of the foreground sub-image and a value of the first image attribute is not greater than a preset threshold, adjust the value of the second image attribute, the difference between the adjusted value of the second image attribute and the value of the first image attribute being not less than the preset threshold.

20. The device of claim 13, wherein the instructions further cause the processor to:
upon determining that a difference between a value of a preset image attribute of the foreground image and a value of the first image attribute is not greater than a preset threshold, adjust a value of a second image attribute of the foreground sub-image, the difference between the adjusted value of the second image attribute and the value of the first image attribute being not less than the preset threshold.

* * * * *